United States Patent
Odeh (10) Patent No.: US 11,874,382 B2
(45) Date of Patent: Jan. 16, 2024

(54) GNSS SPOOFING DETECTION USING PEAK SUPPRESSION MONITOR

(71) Applicant: MITRE Corporation, McLean, VA (US)

(72) Inventor: Ali M. Odeh, McLean, VA (US)

(73) Assignee: MITRE Corporation, McLean, VA (US)

( * ) Notice: Subject to any disclaimer, the term of this patent is extended or adjusted under 35 U.S.C. 154(b) by 36 days.

(21) Appl. No.: 17/174,217

(22) Filed: Feb. 11, 2021

(65) Prior Publication Data

US 2022/0252734 A1 Aug. 11, 2022

(51) Int. Cl.
*G01S 19/21* (2010.01)
*G01S 19/30* (2010.01)
*H04K 3/00* (2006.01)
*G01S 19/05* (2010.01)
*G01S 19/27* (2010.01)

(52) U.S. Cl.
CPC ............ *G01S 19/215* (2013.01); *G01S 19/30* (2013.01); *H04K 3/90* (2013.01); *G01S 19/05* (2013.01); *G01S 19/27* (2013.01)

(58) Field of Classification Search
CPC ................................. G01S 19/215; G01S 19/21
See application file for complete search history.

(56) References Cited

U.S. PATENT DOCUMENTS

| | | | | |
|---|---|---|---|---|
| 4,998,111 A * | 3/1991 | Ma | ........................... | G01S 19/24 342/352 |
| 6,888,497 B2 * | 5/2005 | King | ........................ | G01S 19/30 342/357.69 |
| 6,987,820 B1 * | 1/2006 | Brenner | .................... | G01S 19/22 375/343 |
| 7,821,455 B2 * | 10/2010 | Chen | ........................ | G01S 19/37 342/357.71 |

(Continued)

OTHER PUBLICATIONS

Jafarnia-Jahromi et al. ("GPS Vulnerability to Spoofing Threats and a Review of Antispoofing Techniques"). Hindawi Publishing Corporation International Journal of Navigation and Observation vol. 2012, Article ID 127072, 16 pages (Year: 2012).*

(Continued)

*Primary Examiner* — Gregory C. Issing
(74) *Attorney, Agent, or Firm* — Jones Day (57) ABSTRACT

A peak suppression monitor is coupled to a tracking channel. The peak suppression monitor facilitates receiving, from the tracking channel over a time period, real-time correlation data derived from a global navigation satellite system signal. The real-time correlation data having one or more peaks. Predicted correlation data corresponding to the real-time correlation data is determined based on historical correlation data. A presence of spoofing within the real-time correlation data is identified based on one or more peaks of residual correlation data. The residual correlation data including a comparison between the real-time correlation data and the predicted correlation data. Spoofing detecting data is gen- (Continued)

erated based on the presence of spoofing and the residual correlation data. The generated spoofing detecting data to the tracking channel is provided for further mitigation or a notification identifying the presence of spoofing is provided to a user.

26 Claims, 9 Drawing Sheets

(56) References Cited

U.S. PATENT DOCUMENTS

| 8,400,353 | B2* | 3/2013 | Tarlow | G01S 19/22 |
| | | | | 342/357.58 |
| 9,166,649 | B2* | 10/2015 | Revol | G01S 19/21 |
| 2001/0033606 | A1* | 10/2001 | Akopian | H04B 1/7075 |
| | | | | 375/150 |
| 2003/0161543 | A1* | 8/2003 | Tanaka | H04B 1/70751 |
| | | | | 375/E1.003 |
| 2003/0187576 | A1* | 10/2003 | Sanmiya | H04B 1/7075 |
| | | | | 375/E1.003 |
| 2005/0047493 | A1* | 3/2005 | Underbrink | H04B 1/7107 |
| | | | | 375/150 |
| 2007/0194984 | A1* | 8/2007 | Waid | G01S 19/215 |
| | | | | 342/357.59 |
| 2008/0191932 | A1* | 8/2008 | Hemming | G01S 19/30 |
| | | | | 375/E1.003 |
| 2016/0146944 | A1* | 5/2016 | Geren | H04K 3/65 |
| | | | | 342/357.59 |
| 2020/0371247 | A1* | 11/2020 | Marmet | G01S 19/254 |

OTHER PUBLICATIONS

Ledvina et al. ("An In-line Anti-Spoofing Device for Legacy Civil GPS Receivers"). ION 2010 International Technical Meeting. Jan. 25-27, 2010. San Diego, California. pp. 698-712. (Year: 2010).*

Pini et al ("Detection of Correlation Distortions Through Application of Statistical Methods"). Proc of the 26th International Technical Meeting of the ION Satellite Division. ION GNSS+. Sep. 2013. pP. 3279-3289. (Year: 2013).*

Guo et al. "Spoofing Detection and Mitigation in a Multi-Correlator GPS Receiver Based on Maximum Likelihood Principle." Sensors (Basel). 2018;19(1):37. Published Dec. 22, 2018. doi:10.3390/s19010037 (Year: 2018).*

E. Schmidt, et al., "Software-Defined Radio GNSS Instrumentation for Spoofing Mitigation: A Review and a Case Study," in IEEE Transactions on Instrumentation and Measurement, vol. 68, No. 8, pp. 2768-2784, Aug. 2019, doi: 10.1109/TIM.2018.2869261. (Year: 2019).*

E. Schmidt et al "A GPS Spoofing Detection and Classification Correlator-Based Technique Using the LASSO," in IEEE Transactions on Aerospace and Electronic Systems, vol. 56, No. 6, pp. 4224-4237, Dec. 2020, doi: 10.1109/TAES.2020.2990149. (Year: 2020).*

Xiaowen et al."Fast Acquisition of GPS Signal Using Extended Multiple Correlator Based on FPGA" 2010 International Conference on Computer Application and System Modeling. 2010. pp. V5-208-211. (Year: 2010).*

Chiarello et al. "Detection of GNSS Spoofing by a Receiver in Space via Fusion of Consistency Metrics" ICC 2020—2020 IEEE International Conference on Communications (ICC), Dublin, Ireland, 2020, pp. 1-6, doi: 10.1109/ICC40277.2020.9149061. (Year: 2020).*

* cited by examiner

GNSS SPOOFING DETECTION USING PEAK SUPPRESSION MONITOR

TECHNICAL FIELD

The following disclosure relates to systems, methods, and devices for detecting and suppressing Global Navigation Satellite System (GNSS) spoofing.

BACKGROUND

GNSS provides critical position, velocity, and timing (PVT) capabilities to military, civilian, and/or commercial users around the world. GNSS can however become vulnerable to unintentional and/or malicious interference. Spoofing is a form of intentional interference in which synthetic GNSS signals are broadcast to cause a GNSS receiver to use false signals and obtain an incorrect position and/or time solution.

SUMMARY

In one aspect, a system for detecting global navigation satellite system spoofing includes a peak suppression monitor coupled to a tracking channel. The peak suppression monitor includes memory storing instructions, which when executed by at least one data processer result in operations including receiving, from the tracking channel over a time period, real-time correlation data derived from a global navigation satellite system (GNSS) signal. The real-time correlation data having one or more peaks. Predicted correlation data corresponding to the real-time correlation data is determined based on historical correlation data. A presence of spoofing within the real-time correlation data is identified based on one or more peaks of residual correlation data. The residual correlation data includes a comparison between the real-time correlation data and the predicted correlation data. Spoofing detecting data is generated based on the presence of spoofing and the residual correlation data. At least one of the following is provided: (i) the generated spoofing detecting data to the tracking channel for further mitigation or (ii) a notification identifying the presence of spoofing to a user.

In some variations, the real-time correlation data can include (i) a first pseudorandom noise (PRN) code associated with an authentic GNSS signal and (ii) a second PRN code associated with a counterfeit GNSS signal.

In other variations, the identifying the presence of spoofing can include suppressing the first PRN code within the real-time correlation data.

In some variations, the operations further include (i) aligning the one or more peaks of the real-time correlation data with the one or more peaks of the predicted correlation data by delaying the predicted correlation data and (ii) determining the residual correlation data subtracting the predicted correlation data from the real-time correlation data.

In other variations, the predicted correlation data can be delayed to align a peak of the predicted correlation data with the real-time correlation data.

In some variations, a peak of the predicted correlation data can be determined based on the historical correlation data.

In other variations, the spoofing can be identified based on (i) a presence of at least two peaks within the residual correlation data and (ii) one of the at least two peaks exceeds a predetermined spoofing threshold for at least a breach duration time period.

In some variations, the further characterization can include providing, by the peak suppression monitor, spoofing signal data comprising the residual correlation data to a tracking channel. The tracking channel can transmit the real-time correlation data to the peak suppression monitor. The further characterization can also include mitigating the identified spoofing by (i) generating a corrected PRN code that is equal and opposite to generated spoofing detecting data and (ii) removing the corrected PRN code from the real-time correlation data.

In other variations, the operations can further include periodically repeating the determining of the predicted correlation data over the time period.

Non-transitory computer program products (i.e., physically embodied computer program products) are also described that store instructions, which when executed by one or more data processors of one or more computing systems, cause at least one data processor to perform operations described herein. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The above and other aspects and their implementations are described in greater detail in the drawings, the descriptions, and the claims.

DETAILED DESCRIPTION

Each satellite within a GNSS constellation has a unique pseudorandom noise (PRN) code. The PRN code is transmitted within a GNSS signal transmitted by a satellite. This PRN code allows a receiver to identify which satellite transmitted the signal that it received. In a GNSS receiver, there are one or more code tracking channels that can be configured to track these PRN codes. These code tracking channels use a correlator tap output (CTO) to detect the presence and delay of a particular PRN code. The CTO of a receiver's code tracking channel can be dominated by a single peak. That single peak can correspond to the single authentic satellite PRN code, but during a spoofing attack the CTO can have multiple peaks due to additional counterfeit PRN codes within the GNSS signal.

Techniques for detecting and suppressing GNSS spoofing can be implemented using a peak suppression (PS) monitor. The PS monitor as described herein can use historical and present CTO measurements to detect multiple peaks on a single channel. When multiple peaks are detected on a single channel, a flag can be raised to notify the user of a spoofing event. Once the spoofing is detected, the spoofing can be mitigated.

Figure 1:
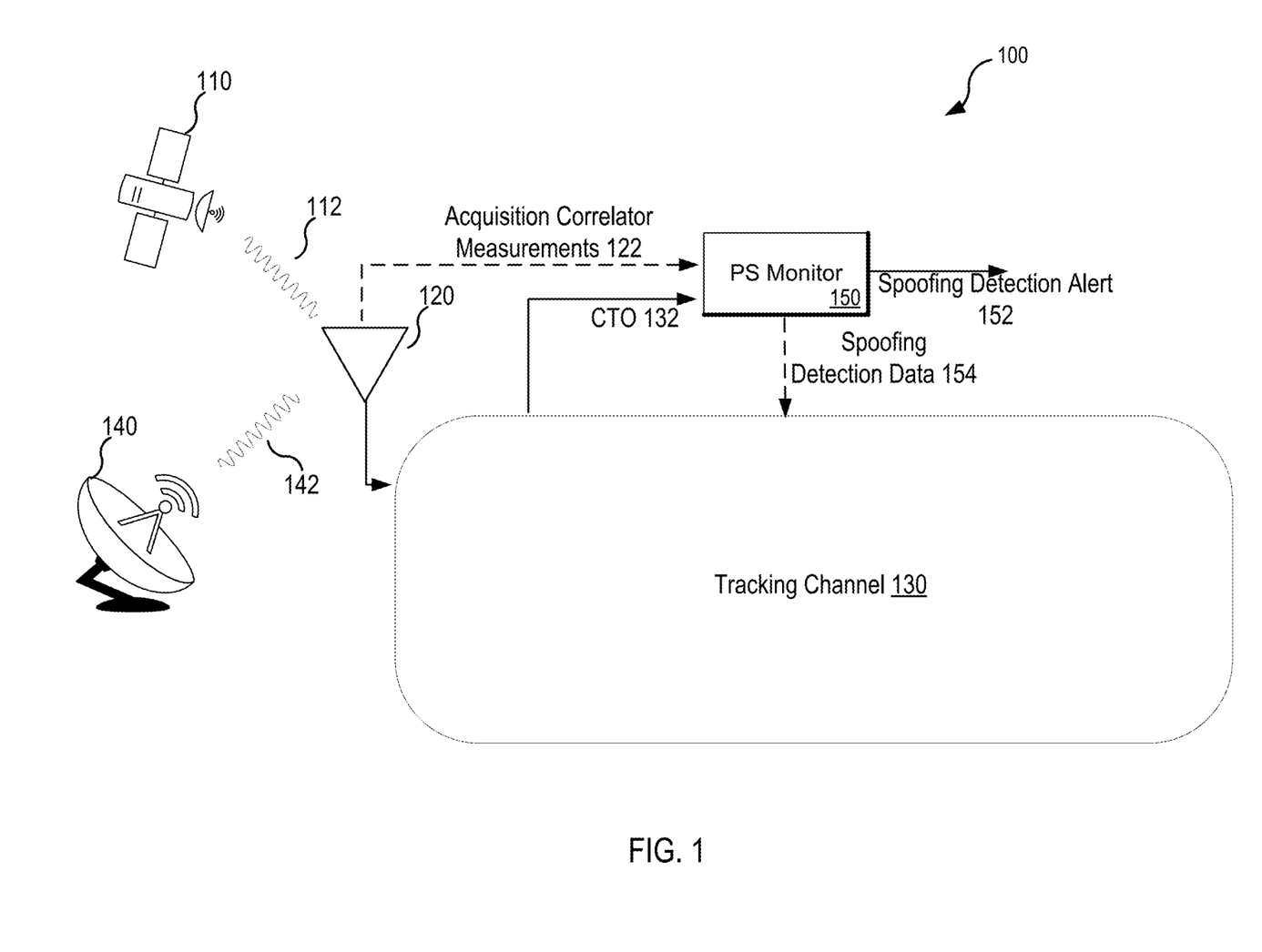
FIG. 1 shows an example block diagram of a GNSS tracking system.

FIG. 1 shows an example block diagram of a GNSS tracking system 100. A GNSS satellite 110 in orbit transmits one or more authentic GNSS signals 112. Each authentic GNSS signal 112 can include at least two carrier frequencies, a PRN code, and navigational data. The PRN code within authentic GNSS signal 112 is unique to the GNSS satellite 110 and is a known or authentic PRN code. In the absence of spoofing, a receiver 120 receives the authentic GNSS signal 112.

Figure 2:
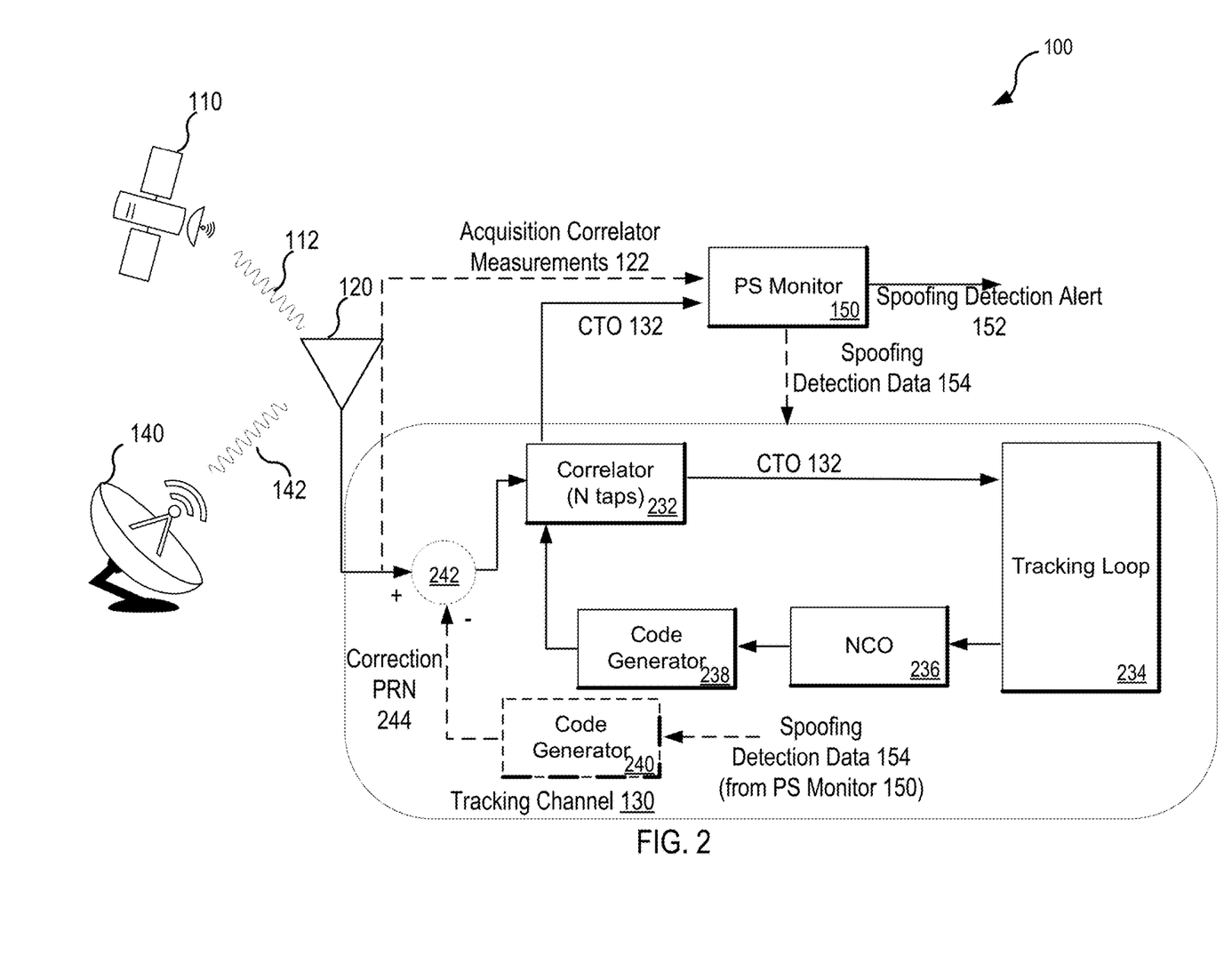
FIG. 2 shows an example block diagram of a GNSS tracking system and components within the tracking channel.

Receiver 120 is coupled to any number of tracking channels (e.g., 6 channels, 12 channels, 100 channels, etc.). For simplicity and ease of understanding, a single tracking channel 130 is illustrated in FIGS. 1-2. In some embodiments, receiver 120 is a software-defined receiver (SDR). In other embodiments, receiver 120 is a physical receiver. Receiver 120 can include one or more acquisition correlators that can provide measurements to PS monitor 150, as described in more detail in FIG. 3. Each tracking channel tracks a GNSS signal from a different satellite. For example, tracking channel 130 tracks the authentic GNSS signal 112 transmitted by satellite 110. Because each satellite 110 transmits a known or authentic PRN code, the tracking channel 130 contains a PRN code replica. The PRN code replica is a replica of the known or authentic PRN code for the particular satellite it tracks. In other words, tracking channel 130 contains a PRN code replica of the authentic PRN code associated with GNSS satellite 110. In some embodiments, tracking channel 130 is a primary channel responsible for tracking one or more signals. In other embodiments tracking channel 130 is a utility channel responsible for obtaining one or more correlation measurements. The tracking channel 130 extracts the PRN code from the authentic GNSS signal 112 to validate it against the PRN code replica. When the extracted PRN code matches the PRN code replica, the phase offset of the replica code represents the time of transmission of the GNSS signal 112 from satellite 110. Transmit time measurements along with the receive time are used to obtain PVT measurements, which can be used by an electronic device for purposes such as identifying position.

A spoofing attack occurs when a spoofer station transmits a counterfeit signal that interferes with the authentic GNSS signal. For example, spoofer station 140 transmits a counterfeit GNSS signal 142. That counterfeit GNSS signal 142 appears to have the same characteristics as the authentic GNSS signal 112. For example, the counterfeit GNSS signal 142 can include carrier frequencies, a PRN code, and navigational data. The PRN code within counterfeit GNSS signal 142 can have similar characteristics to the authentic PRN code associated with GNSS satellite 120 so as to "spoof" the tracking channel 130 to align the PRN code replica with the counterfeit PRN code. That counterfeit PRN code, however, can force the replica code to be misaligned with the authentic PRN code, which results in inaccurate transmit time measurement that in turn lead to false PVT measurements. Use of false position navigational data can, for example, cause an aircraft to physically divert to a spoofed path, rather than a planned path.

Receiver 120 can receive both the authentic GNSS signal 112 and the counterfeit GNSS signal 142, either simultaneously or sequentially in time. Tracking channel 130, as previously described, extracts the PRN code from the received signals (e.g., authentic GNSS signal 112 and counterfeit GNSS signal 142) and compares the extracted PRN code to the PRN code replica. This comparison by tracking channel 130 generates a CTO (CTO) 132, as described in more detail in FIG. 2. The CTO 132 can include a cross-correlation function and/or an autocorrelation function. The CTO 132 is used as input by the PS monitor 150. PS monitor 150 can be computing logic implemented in software. Based on the CTO 132, PS monitor 150 can identify the presence of the counterfeit signal 142, as described in more detail in FIGS. 3, 4, and 5A-5B. PS monitor 150 generates a spoofing detection alert 152 identifying whether spoofing is detected within the signals received by receiver 120. The spoofing detection alert 152, for example, can be a text alert displayed on a graphical user interface (GUI), as described in FIGS. 6A-6B. In addition to or in lieu of a spoofing detection alert 152, spoofing detection data 154 can be provided by PS monitor 150 to tracking channel 130 for further mitigation of the spoofer as described in more detail in FIG. 2. The spoofing detection data 154 can include a residual signal computed by the PS monitor 150, which is described in more detail in FIGS. 2, 3, 4, and 5A-5B.

FIG. 2 shows an example block diagram of a GNSS tracking system 100 and components within the tracking channel 130. Tracking channel 130 can be any type of tracking channel known in the art. Tracking channel 130 is configured to identify and track PRN codes using a CTO. For simplicity and ease of understanding, the tracking channel 130 depicted in FIG. 2 includes a correlator 232, tracking loop 234, numerically controlled oscillator (NCO) 236, and code generator 238. Correlator 232 compares the signals received by receiver 120 with the PRN code replica. More specifically, correlator 232 makes this comparison by generating a CTO 132 as discussed in more detail in FIG. 3. The CTO 132 is a comparison between the extracted PRN code from the received signal (e.g., PRN code extracted from authentic GNSS signal 112 and/or the PRN code from the counterfeit GNSS signal 142) to the replica PRN code stored within code generator 238. Correlator 232 is configured to track "taps" of the signal. In some embodiments, correlators use three taps (e.g., early tap, prompt tap, and late tap) to track the received signal. A "tap" is a measurement point taken from the received signal (e.g., authentic GNSS signal 112 and/or counterfeit GNSS signal 142). Correlator 232 can use any number of taps (e.g., N taps) to track the incoming signal (e.g., 1 tap, 6 taps, 9 taps, 12 taps, 24 taps, 36 taps, 100 taps, etc.). Each tap is compared with a corresponding point of the replica PRN code. The CTO 132 is provided as input to the PS monitor 150 for further computation as described in FIGS. 4A-4C. The CTO 132 is also provided to tracking loop 234. A tracking loop can estimate a phase associated with the signals received by receiver 120. The estimated phase can be provided to NCO 236, which in turn provides the phase information to code generator 238. Code generator 238 stores the PRN code replica associated with GNSS satellite 110 and provides that PRN code replica to the correlator 232.

Tracking channel 130 can optionally include another code generator 240 and a summer 242 to facilitate mitigating any spoofing detected by PS monitor 150. PS monitor 150 can generate spoofing detection data 154 that includes estimates of an amplitude and/or delay associated with one or more spoofing signals. These estimates can be feed to a code generator 240 to produce a correction PRN code 244. The correction PRN code 244 can be approximately equal and opposite to the spoofer PRN code estimated by the PS monitor 150. The correction PRN code 244 can be provided to the summer 242. Summer 242 then removes the correction PRN code from the signal received by receiver 120. The summer 242 outputs an approximate cancellation of the spoofer PRN code to correlator 232. The approximate cancellation output by summer 242 effectively removes the spoofer peak from the CTO 132 and in turn mitigates the spoofing threat.

For simplicity and ease of understanding, the embodiments described in FIGS. 1-2 illustrate performing the CTO on signals received from one GNSS satellite 110. But it is understood that GNSS signals are tracked using a number of different satellites, such as four satellites, to accurately calculate and track position. Accordingly, it is contemplated that these computations are to be performed on signals received from each satellite that is relied upon for determining location/position. Similarly, although spoofer station 140 is illustrated in FIGS. 1-2 as a device that transmits from ground (a "ground station"), it is understood that a spoofer station may also be a device located in an airplane, or in orbit. Similarly, for simplicity and each of understanding one tracking channel 130 is illustrated in FIGS. 1-2. But it is understood that any number of tracking channels can be used in parallel to identify and/or mitigate spoofing in the manner discussed herein.

Figure 3:
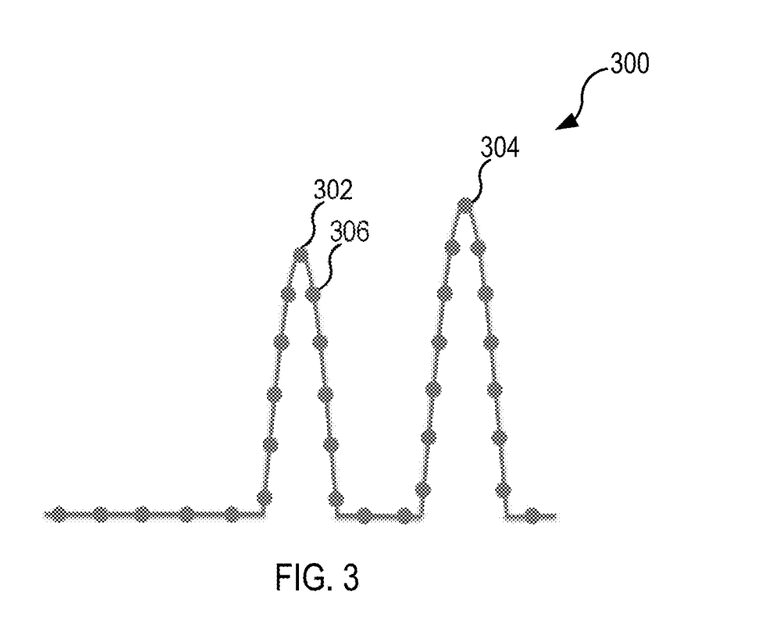
FIG. 3 is an example waveform of the CTO generated by the tracking channel, more specifically the correlator.

FIG. 3 is an example waveform 300 of the CTO 132 generated by correlator 232 of the tracking channel 130. When spoofing is not present (e.g., instances when receiver 120 receives only authentic GNSS signal 112), the generated waveform of the CTO 132 has a single peak. When spoofing is present (e.g., instances when receiver 120 receives both the authentic GNSS signal 112 and counterfeit GNSS signal 142), the generated waveform of the CTO 132 contains multiple peaks. The two peaks result from two PRN codes (e.g., PRN code from authentic GNSS signal 112 and PRN code associated with counterfeit GNSS signal 142) being correlated with one PRN code replica stored within code generator 238. The example waveform 300 illustrates the presence of multiple peaks (e.g., authentic peak 302 and counterfeit peak 304). The authentic peak 302 is associated with the PRN code extracted from authentic GNSS signal 112. The counterfeit peak 304 is associated with the PRN code extracted from the counterfeit GNSS signal 142. Although the authentic peak 302 and the counterfeit peak 304 are illustrated as being spatially separated along the x-axis (e.g., have different phases), in some embodiments, these peaks may overlap each other (e.g., have identical or substantially similar phases). The PS monitor 150 collects the CTO 132 over a period of time (e.g., 1 to 10 seconds) to estimate an amplitude of authentic peak 302. The CTO 132 can include a number of taps or measurement points illustrated in FIG. 3 as dots along the waveform 300 (e.g., tap 306). An increased number of taps can facilitate a more accurate spoofing detection computation performed by PS monitor 150. In some embodiments, the number of taps (e.g., N taps) can depend upon the configuration of the correlator 232. In other embodiments, additional taps or measurement points can be added by modifying a software defined receiver configuration. In yet other embodiments, additional acquisition correlator measurements 122 can be combined with the CTO 132 to provide the additional taps.

Figure 4:
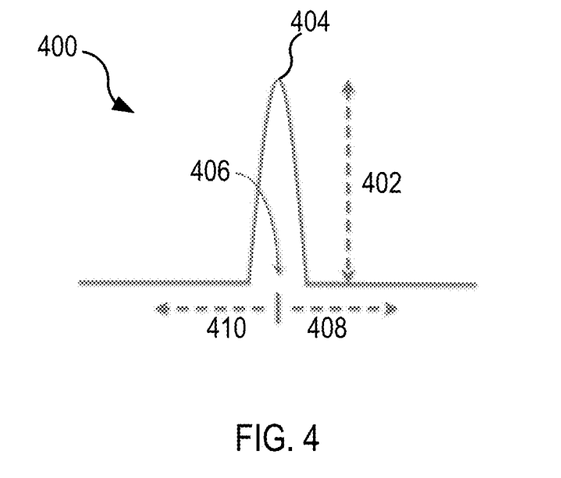
FIG. 4 is an example waveform of a predicted CTO generated by the PS monitor.

FIG. 4 is an example waveform 400 of a predicted CTO generated by the PS monitor 150. The predicted CTO is based on both historical CTOs received by PS monitor 150 and current real-time measurements provided by correlator 232 (e.g., CTO 132) and/or receiver 120 (e.g., acquisition correlator measurements 122). More specifically, the height 402 of peak 404 is based on previous correlator measurements. For example, PS monitor 150 can track and store previously received CTO peak values. At the start of the detection routine (e.g., when no spoofing is present), the PS monitor 150 collects and averages the maximum actual CTO measurement over a set period of time (e.g., from 10 to 30 code periods, and in other embodiments from 1 to 35 code periods) to estimate the amplitude of the predicted CTO peak. The period of time or number of code periods should be long enough to reduce noise in the residual CTO values and shorter than a typical duration of a lift-off stage of a spoofing attack. An optional recalibration routine can be performed periodically on a channel-by-channel basis. The peak 404 of the predicted CTO is delayed in phase or in time to align with the real-time CTO measurements received by PS monitor 150. In other words, the delay 406 shifts the peak 404 to the right 408 or the left 410 so as to overlap the real-time CTO measurements (e.g., CTO 132). The pattern of waveform 400 can be a simple triangular function, a stored data pattern representing the normalized autocorrelation function of the tracked PRN code, or the normalized autocorrelation of the PRN code replica.

Figure 5A:
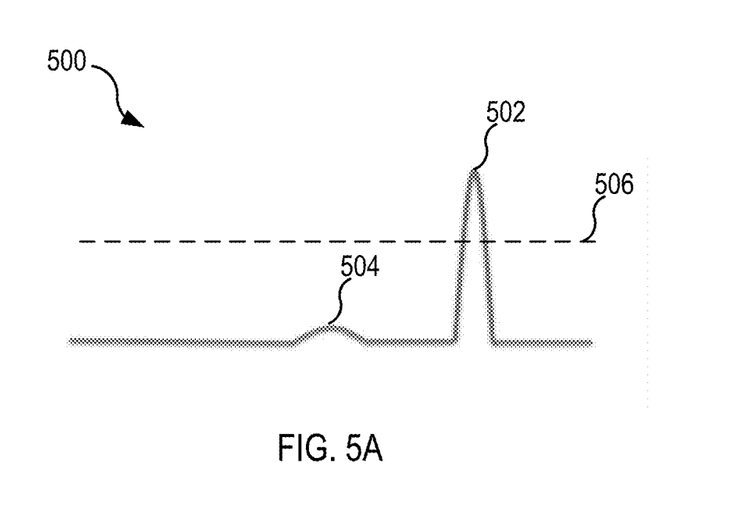
FIG. 5A shows an example waveform of a residual signal where spoofing is detected.
Figure 7:
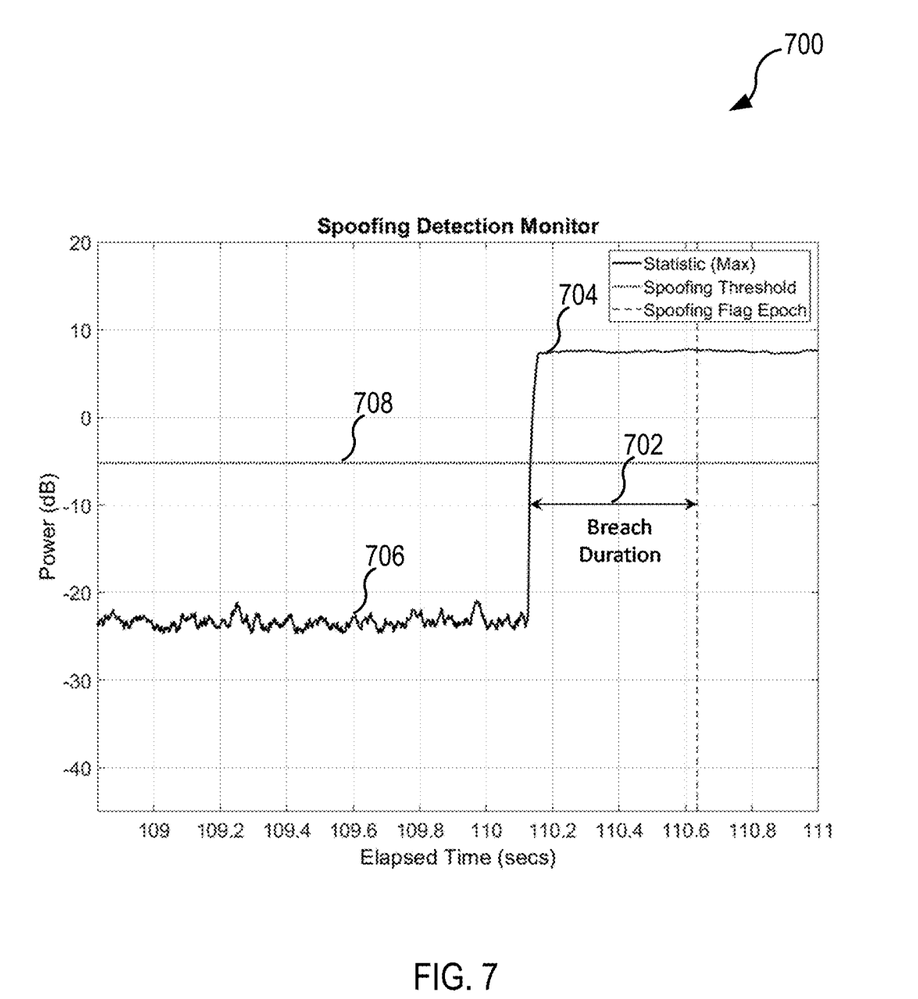
FIG. 7 shows another example GUI display generated by PS monitoring illustrating a breach duration.

To detect the presence of counterfeit GNSS signal 142 in the signals received by receiver 120, the PS monitor 150 removes or suppresses the authentic peak from waveform 300 of CTO 132 using the predicted CTO waveform 400. FIG. 5A shows an example waveform 500 of a residual signal where spoofing is detected. The residual signal includes peaks 502, 504. The PS monitor 150 compares each peak to a spoofing threshold 506. The spoofing threshold 506, in some variations, is a fixed ratio between the power of the residual CTO and the predicted CTO (e.g., from 0 dB to −7 dB, and in other embodiments from 0 to −10 dB). This ratio can be the same for all PRN/channels. If the monitored statistic breaches the spoofing threshold 506 for a given duration of time (e.g., breach duration of approximately 300 to 700 code periods, and in other embodiments from 100 to 800 code periods), then spoofing has been detected. Any peak that equals or exceeds the spoofing threshold 506 corresponds with the PRN code of the counterfeit GNSS signal 142. Any peak that is less than the spoofing threshold 506 corresponds with the PRN code of the authentic GNSS signal 112. In the example waveform 500, peak 502 exceeds the spoofing threshold for the breach duration (as illustrated in FIG. 7) and therefore corresponds with the PRN code of the counterfeit GNSS signal 142. Peak 504 is less than the spoofing threshold 504 and therefore corresponds with the PRN code of the authentic GNSS signal 112. The peak 506 can account for any offset between the peak of the real-time CTO waveform (e.g., peak 302) and the predicted CTO waveform (e.g., peak 404). Because at least one of the peaks 502, 504 exceeds the spoofing threshold 506 in the waveform 500 for the breach duration, the PS monitor 150 identifies that spoofing is detected in the signals received by receiver 120. In response, PS monitor 150 can output a spoofing detection alert 152 that indicates spoofing is detected. The residual signal (e.g., the difference between the waveform 300 of the actual CTO 132 and the waveform 400 of the predicted CTO) computed by PS monitor 150 can be provided to tracking channel 130 for further mitigation of the detected spoofing as previously described.

Figure 5B:
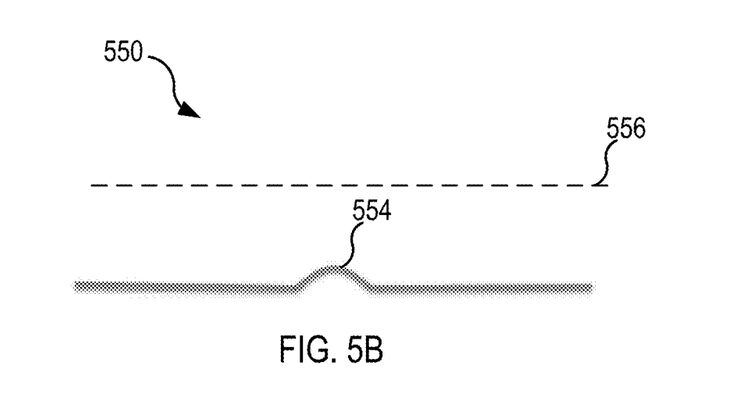
FIG. 5B shows another example waveform of a residual signal where spoofing is not detected.

FIG. 5B shows another example waveform 550 of a residual signal where spoofing is no detected. The residual signal includes a single peak 554. Based on the presence of a single peak in the residual signal, PS monitor 150 can determine that there is no spoofing present. Additionally, the peak 554 is compared by PS monitor 150 with the spoofing threshold 556. Because peak 554 is less than the spoofing threshold 556, the peak 554 corresponds to the PRN code of the authentic GNSS signal 112.

For simplicity and ease of understanding, the signals illustrated in FIGS. 3, 4, and 5A-5B are smooth plots representing ideal signals with no noise and/or additional fluctuation. But it is understood that actual signals output by correlator 132 may include some residual noise such as white noise causing the signal to have minor blips and fluctuations such as what is depicted in residual signals 602, 652 of FIGS. 6A-6B.

Figure 6A:
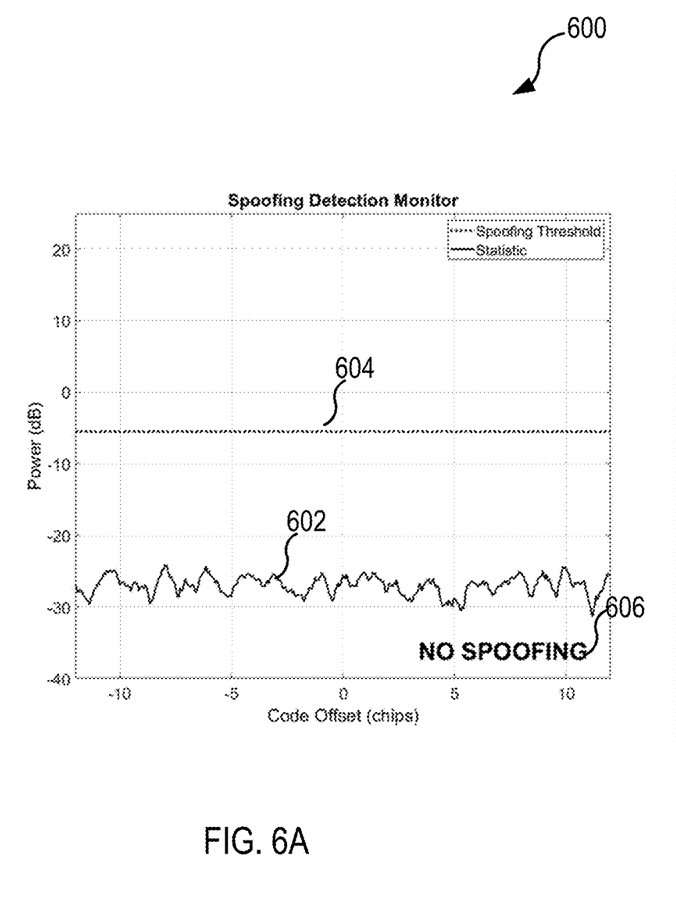
FIG. 6A shows an example GUI display generated by PS monitor alerting a user that no spoofing was detected.

FIG. 6A shows an example GUI display 600 generated by PS monitor 150 alerting a user that no spoofing was detected. PS monitor 150, in some embodiments, generates a graphical representation (e.g., GUI display) of spoofing detection. The GUI display 600 illustrates power (dB) (e.g., y-axis) of the residual signal 502 as a function code offset (e.g., x-axis). The GUI display 600 also includes a depiction of the spoofing threshold 604. A spoofing detection alert 606 indicates whether spoofing has been detected. In the example of FIG. 6A, the spoofing detection alert 606 indicates "NO SPOOFING" as one or more peaks of the residual signal 602 are less than the spoofing threshold 604. The spoofing detection alert 606 can be a textual alert on the GUI display 600.

Figure 6B:
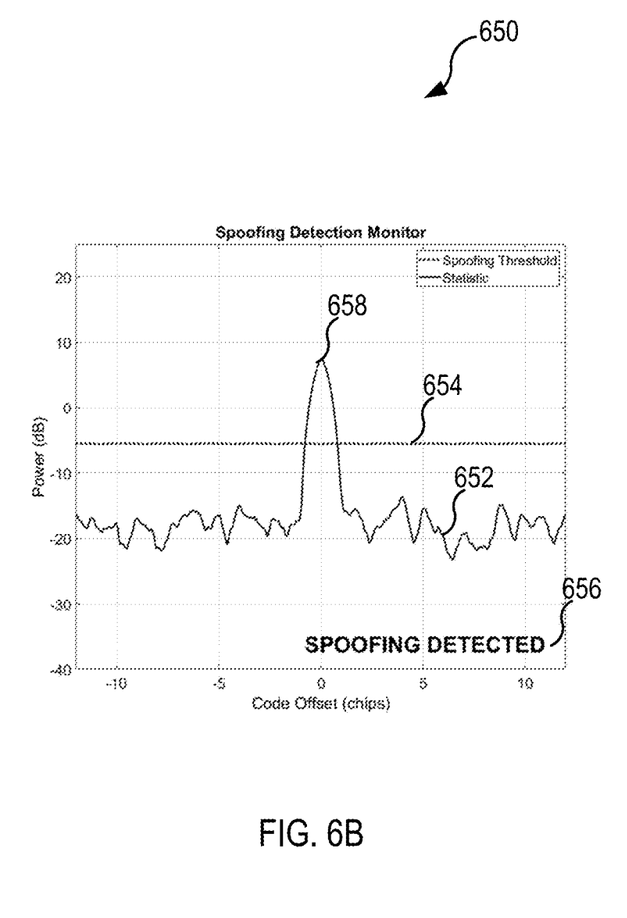
FIG. 6B shows another example GUI display generated by PS monitor alerting a user that spoofing was detected.

FIG. 6B shows another example GUI display 650 generated by PS monitor 150 alerting a user that spoofing was detected. In this example GUI display 650, the spoofing detection alert 656 indicates "SPOOFING DETECTED" as one or more peaks 658 of the residual signal 652 are above the spoofing threshold 654 for a breach duration. Any of the GUI displays 600, 650 can depict the residual signal 602, 652 as a snapshot in time with a stagnant graph or a real-time graphical representation with the residual signal 602, 652 dynamically changing.

FIG. 7 shows another example GUI display 700 generated by PS monitor 150 illustrating a breach duration 702. As discussed in FIGS. 5A and 6B, spoofing was detected as one or more peaks 502, 658 exceeded the spoofing thresholds 506, 654, respectively for a breach duration. The x-axis of GUI display 700 represents elapsed time. The breach duration 702 is a predetermined time period in which one or more peaks 704 of the residual signal 706 should exceed a spoofing threshold 708 in order to identify spoofing. As illustrated in GUI display 700, the duration of time in which one or more peaks exceeds the spoofing threshold 708 is greater than the breach duration 702. Therefore, spoofing is present.

Figure 8:
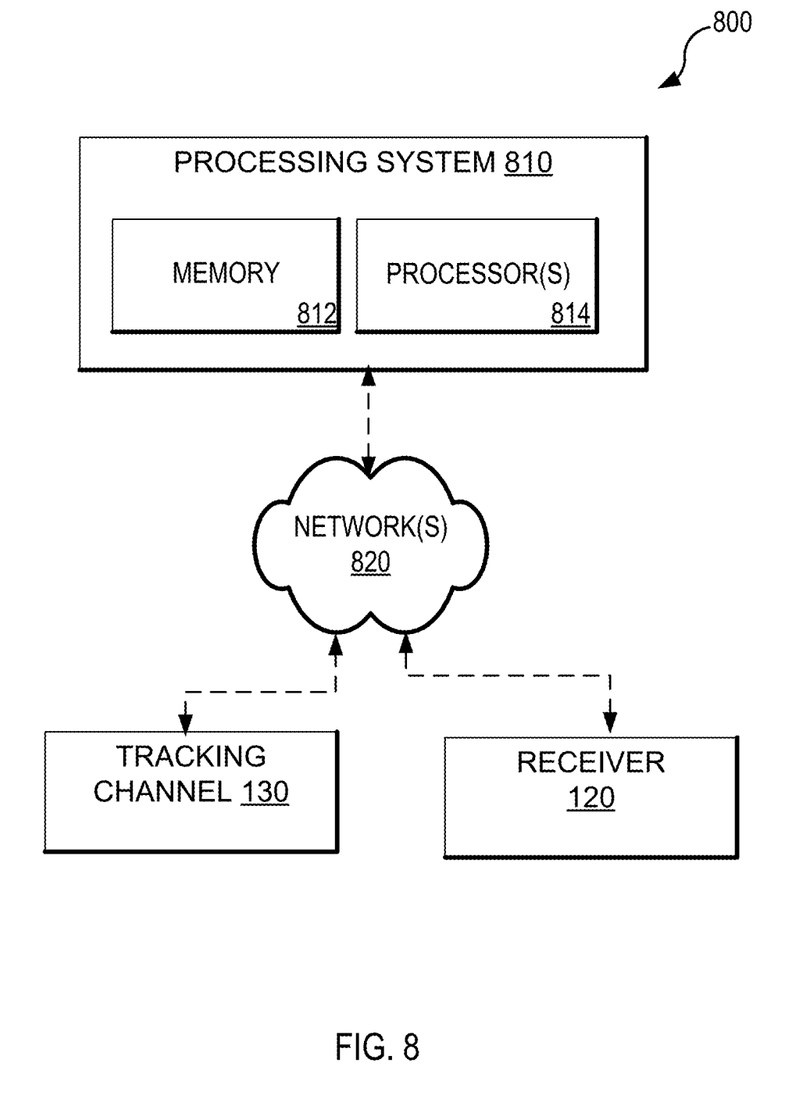
FIG. 8 is a block diagram illustrating an example computer-implemented environment where PS monitor interfaces with the tracking channel and/or receiver as previously described.

FIG. 8 is a block diagram illustrating an example computer-implemented environment 800 where PS monitor 150 interfaces with the tracking channel 130 and/or receiver 120 as previously described. In some embodiments, PS monitor 150 can be implemented in software on a standalone processing system 810 coupled to the tracking channel 130 either physical (e.g., with one or more cables) or wirelessly (via a wireless network 820). In other embodiments, the PS monitor 150 is integrated within tracking channel 130. The PS monitor 150 can be stored on memory 812 in the form of memory storing instructions, which when executed by one or more data processors 814 result in the operations described in FIGS. 1-6 and 9.

Figure 9:
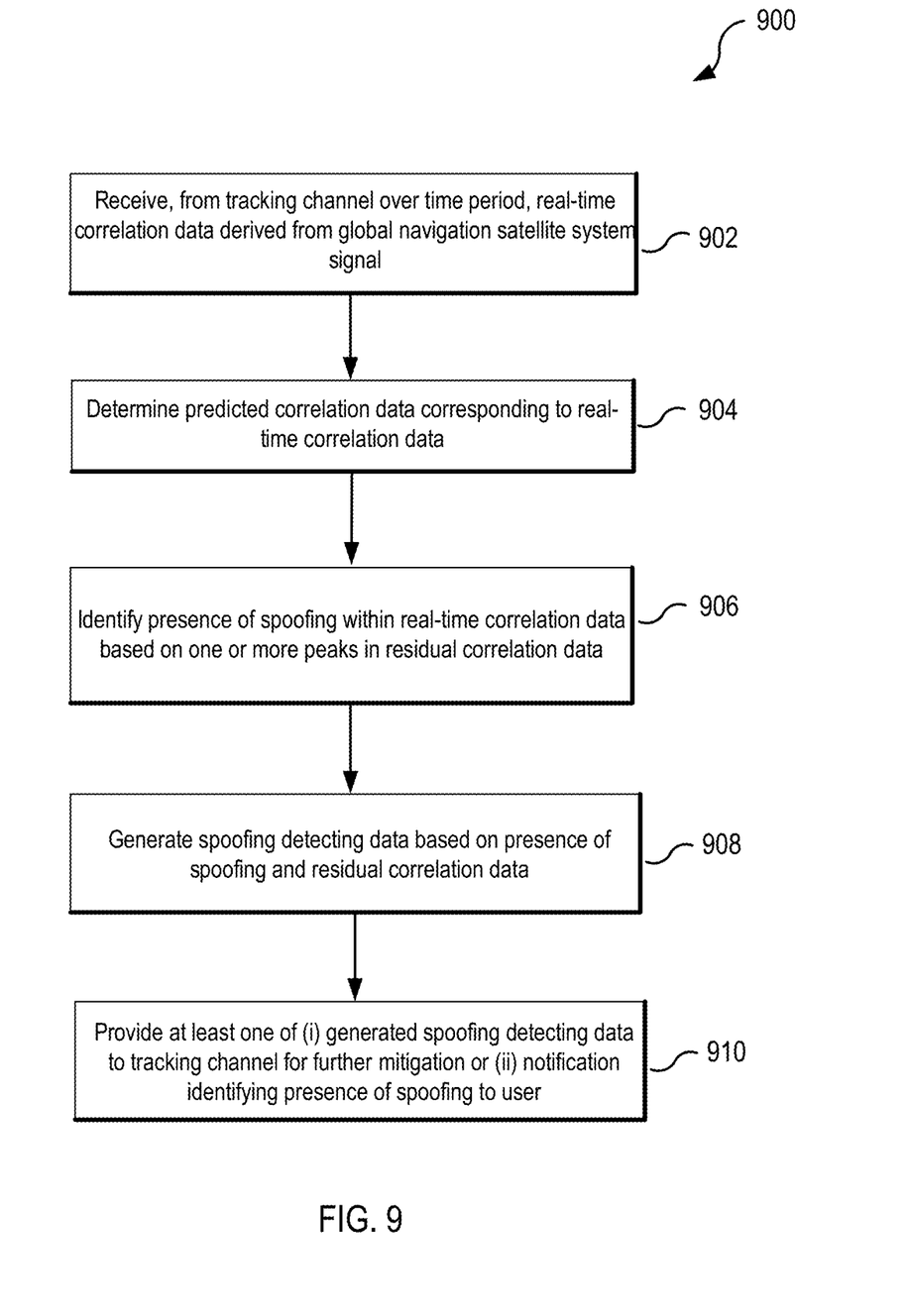
FIG. 9 is a flow chart illustrating detection of GNSS spoofing.

FIG. 9 is a flow chart 900 illustrating detection of GNSS spoofing (e.g., detecting when receiver 120 has received counterfeit GNSS signal 142 in addition to the authentic GNSS signal 112). A PS monitor 150 coupled to a tracking channel 130 receives, at step 902, real-time correlation data (e.g., CTO 132) derived from one or more GNSS signals (e.g., authentic GNSS signal 112 and/or counterfeit GNSS signal 142). PS monitor 150 determines or computes, at step 904, predicted correlation data (e.g., predicted CTO of waveform 400) corresponding to the real-time correlation data (e.g., CTO 132). The predicted correlation data is based, in part, on historical correlation data (e.g., height 402 of waveform 400). A presence of spoofing is identified, at step 906, by PS monitor 150 within the real-time correlation data based on one or more peaks of residual correlation data (e.g., peaks 502, 504 of waveform 500). The residual correlation data is determined based on a comparison (e.g., subtraction) between the real-time correlation data and the predicted correlation data. The PS monitor 150 generates, at step 908, spoofing detecting data based on the identified presence of spoofing within the real-time correlation data and the residual correlation data. The spoofing detecting data can include an estimate amplitude and delay associated with the spoofing PRN code. The spoofing detecting data can be used by a code generator (e.g., code generator 240) to generate a correction PRN code 244 that can be approximately equal and opposite to the spoofer PRN code estimated by the PS monitor 150. Alternatively, or in addition, to the generating of the spoofing detecting data, a notification identifying the presence of spoofing can be provided, at step 910, to a user for further mitigation as described in detail in FIGS. 6A-6B.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., non-volatile solid state storage drives, magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for detecting global navigation satellite system spoofing, the system comprising:
   a peak suppression monitor coupled to a tracking channel, the peak suppression monitor includes memory storing instructions, which when executed by at least one data processer result in operations comprising:
   receiving, from the tracking channel, a correlator tap output comprising a point of real-time correlation data, wherein the correlator tap output is a comparison of (i) a tap of real-time data derived from a PRN code extracted from a received global navigation satellite system (GNSS) signal with (ii) a point of replica PRN code corresponding to the tap;
   determining a point of predicted correlation data corresponding to the point of real-time correlation data based on historical correlation data;
   identifying a presence of spoofing within the real-time correlation data by subtracting a magnitude of the predicted correlation data point from a magnitude of the real-time correlation data point, wherein spoofing is identified when the difference value is greater than a threshold amount;
   generating spoofing detecting data based on the identified presence of spoofing; and
   providing at least one of (i) the generated spoofing detecting data to the tracking channel for further mitigation or (ii) a notification identifying the presence of spoofing to a user.

2. The system of claim 1, wherein the real-time correlation data comprises (i) a first pseudorandom noise (PRN) code associated with an authentic GNSS signal and (ii) a second PRN code associated with a counterfeit GNSS signal.

3. The system of claim 2, wherein the identifying the presence of spoofing comprises suppressing the first PRN code within the real-time correlation data.

4. The system of claim 1, wherein the operations further comprise:
   receiving a plurality of correlator tap outputs from the tracking channel over a time period, where the plurality of real-time correlation data comprises one or more peaks;
   aligning the one or more peaks of the CTO with one or more peaks of the predicted correlation data by delaying the predicted correlation data; and
   determining residual correlation data by subtracting the predicted correlation data from the real-time correlation data, wherein spoofing detecting data is generated based on the residual correlation data.

5. The system of claim 4, wherein the threshold level is a ratio between a power of the residual correlation data and the predicted correlation data.

6. The system of claim 4, wherein a peak of the predicted correlation data is determined based on the historical correlation data.

7. The system of claim 4, wherein the spoofing is identified based on (i) a presence of at least two peaks within the residual correlation data and (ii) one of the at least two peaks exceeds a predetermined spoofing threshold for at least a breach duration time period.

8. The system of claim 1, wherein the further mitigation comprises:
 providing, by the peak suppression monitor, spoofing signal data comprising the residual correlation data to a tracking channel, wherein the tracking channel transmits the real-time correlation data to the peak suppression monitor; and
 mitigating the identified spoofing by (i) generating a corrected PRN code that is equal and opposite to generated spoofing detecting data and (ii) removing the corrected PRN code from the real-time correlation data.

9. The system of claim 1, wherein the operations further comprise periodically repeating the determining of the predicted correlation data over time period.

10. The system of claim 1, wherein a plurality of points of real-time correlation data has one or more peaks, the step of identifying spoofing is performed by comparing the one or more peaks with peaks in corresponding predicted correlation data to determine one more peaks of residual correlation data, and identifying a presence of spoofing within the real-time correlation includes determining whether the amplitude of the one or more peaks of the residual correlation data exceeds a threshold level.

11. The system of claim 10, wherein the amplitude of a peak of residual correlation data is measured in decibels.

12. A method for detecting global navigation satellite system spoofing, the method comprising:
 receiving, from the tracking channel, a correlator tap output comprising a point of real-time correlation data, wherein the correlator tap output is a comparison of (i) a tap of real-time data derived from a PRN code extracted from a received global navigation satellite system (GNSS) signal with (ii) a point of replica PRN code corresponding to the tap;
 determining a point of predicted correlation data corresponding to the point of real-time correlation data based on historical correlation data;
 identifying a presence of spoofing within the real-time correlation data by subtracting a magnitude of the predicted correlation data point from a magnitude of the real-time correlation data point, wherein spoofing is identified when the difference value is greater than a threshold amount;
 generating spoofing detecting data based on the identified presence of spoofing; and
 providing at least one of (i) the generated spoofing detecting data to the tracking channel for further mitigation or (ii) a notification identifying the presence of spoofing to a user.

13. The method of claim 12, wherein the real-time correlation data comprises (i) a first pseudorandom noise (PRN) code associated with an authentic GNSS signal and (ii) a second PRN code associated with a counterfeit GNSS signal.

14. The method of claim 13, wherein the identifying the presence of spoofing comprises suppressing the first PRN code within the real-time correlation data.

15. The method of claim 12, further comprising:
 receiving a plurality of correlator tap outputs from the tracking channel over a time period, where the plurality of real-time correlation data comprises one or more peaks;
 aligning the one or more peaks of the CTO with one or more peaks of the predicted correlation data by delaying the predicted correlation data; and
 determining residual correlation data by subtracting the predicted correlation data from the real-time correlation data, wherein spoofing detecting data is generated based on the residual correlation data.

16. The method of claim 15, wherein the threshold level is a ratio between a power of the residual correlation data and the predicted correlation data.

17. The method of claim 15, wherein a peak of the predicted correlation data is determined based on the historical correlation data.

18. The method of claim 15, wherein the spoofing is identified based on (i) a presence of at least two peaks within the residual correlation data and (ii) one of the at least two peaks exceeds a predetermined spoofing threshold for at least a breach duration time period.

19. The method of claim 12, further comprising:
 providing, by a peak suppression monitor, spoofing signal data comprising the residual correlation data to a tracking channel, wherein the tracking channel transmits the real-time correlation data to the peak suppression monitor; and
 mitigating the identified spoofing by (i) generating a corrected PRN code that is equal and opposite to generated spoofing detecting data and (ii) removing the corrected PRN code from the real-time correlation data.

20. The method of claim 12, wherein the operations further comprise periodically repeating the determining of the predicted correlation data over a time period.

21. The method of claim 12, wherein a plurality of points of real-time correlation data has one or more peaks, the step of identifying spoofing is performed by comparing the one or more peaks with peaks in corresponding predicted correlation data to determine one more peaks of residual correlation data, and identifying a presence of spoofing within the real-time correlation includes determining whether the amplitude of the one or more peaks of the residual correlation data exceeds a threshold level.

22. The method of claim 21, wherein the amplitude of a peak of residual correlation data is measured in decibels.

23. A non-transitory computer program product for detecting global navigation satellite system spoofing, the non-transitory computer program product storing instructions, which when executed by at least one data processor forming part of at least one computing device, result in operations comprising:
 receiving, from the tracking channel, a correlator tap output comprising a point of real-time correlation data, wherein the correlator tap output is a comparison of (i) a tap of real-time correlation data derived from a PRN code extracted from a received global navigation satellite system (GNSS) signal with (ii) a point of replica PRN code corresponding to the tap;
 determining a point of predicted correlation data corresponding to the point of real-time correlation data based on historical correlation data;

identifying a presence of spoofing within the real-time correlation data by subtracting a magnitude of the predicted correlation data point from a magnitude of the real-time correlation data point, wherein spoofing is identified when the difference value is greater than a threshold amount;

generating spoofing detecting data based on the identified presence of spoofing; and providing at least one of (i) the generated spoofing detecting data to the tracking channel for further mitigation or (ii) a notification identifying the presence of spoofing to a user.

24. The non-transitory computer program product of claim 23, wherein the operations further comprise:

providing, by a peak suppression monitor, spoofing signal data comprising the residual correlation data to a tracking channel, wherein the tracking channel transmits the real-time correlation data to the peak suppression monitor; and mitigating the identified spoofing by (i) generating a corrected PRN code that is equal and opposite to generated spoofing detecting data and (ii) removing the corrected PRN code from the real-time correlation data.

25. The non-transitory computer program product of claim 23, wherein a plurality of points of real-time correlation data has one or more peaks, the step of identifying spoofing is performed by comparing the one or more peaks with peaks in corresponding predicted correlation data to determine one more peaks of residual correlation data, and identifying a presence of spoofing within the real-time correlation includes determining whether the amplitude of the one or more peaks of the residual correlation data exceeds a threshold level.

26. The non-transitory computer program product of claim 25, wherein the amplitude of a peak of residual correlation data is measured in decibels.

* * * * *